United States Patent [19]

Kim et al.

[11] Patent Number: 5,243,022
[45] Date of Patent: Sep. 7, 1993

[54] METHOD FOR FORMING POLYESTERS

[75] Inventors: Chung Y. Kim; Hyun N. Cho, both of Seoul, Rep. of Korea

[73] Assignee: Korea Institute of Science and Technology, Seoul, Rep. of Korea

[21] Appl. No.: 743,690

[22] Filed: Aug. 12, 1991

[30] Foreign Application Priority Data

Feb. 7, 1991 [KR] Rep. of Korea ............... 2093/1991

[51] Int. Cl.$^5$ ..................... C08G 63/16; C08G 63/83
[52] U.S. Cl. ................................................. 528/308.8
[58] Field of Search ............ 528/272, 286, 308, 308.6, 528/308.8, 309.1

[56] References Cited

FOREIGN PATENT DOCUMENTS 59-047226A 3/1984 Japan.

Primary Examiner—John Kight, III
Assistant Examiner—Jeffrey Culpeper Mullis
Attorney, Agent, or Firm—Leydig, Voit & Mayer

[57] ABSTRACT

A method for forming polyesters (polyethylene terephthalate, PET) having a high degree of polymerization with improved color and lower diethylene glycol (DEG) content in a shorter period of time than in known methods. The method according to the invention comprises forming oligomers from ethylene glycol and terephthalic acid by esterification, forming prepolymers having a degree of polymerization ranging from 10 to 50 by polycondensing the resulting oligomers for an optimum time, forming polyesters by polycondensing the oligomers and the prepolymers in a weight ratio ranging from 1:0.1 to 1:90, thereby providing polyesters of improved color and low DEG content in a short time.

5 Claims, No Drawings

METHOD FOR FORMING POLYESTERS

BACKGROUND OF THE INVENTION

The present invention relates to a method for forming polyesters from terephthalic acid and ethylene glycol and, more particularly, to a method for forming polyesters (polyethylene terephthalate) which possess improved coloration and low diethylene glycol (DEG) content.

In recent years, polyesters, especially polyethylene terephthalate (PET), have been used in manufacturing fibers for clothes, film for magnetic tapes, food containers and resins. In order to be used in products such as these, polyethylene terephthalate needs to possess improved coloration, physical properties and a high degree of polymerization.

There are several conventional methods for preparing polyethylene terephthalate. For example, in the method of direct esterification, terephthalic acid and ethylene glycol are heated under either atmospheric conditions or at elevated pressure at temperatures ranging from about 200° C. to about 280° C. Another method, referred to as ester interchange, comprises heating dimethyl terephthalate and ethylene glycol in the presence of catalysts at temperatures ranging from about 160° C. to 240° C. Subsequently, polymers having a high degree of polymerization (exceeding 100) are prepared by continuously polycondensating the bis(-beta-hydroxyethyl) terephthalate and/or low polymers thereof (oligomers) obtained from the esterification step in the presence of polycondensation catalysts in a high vacuum (not exceeding 1.0 torr) at temperatures ranging from 260° C. to 300° C. The above-mentioned direct esterification process is preferable to the ester interchange process because of its relatively low cost.

In a reaction for forming polyesters, reaction catalysts, for example, compounds of metals such as antimony, titanium, germanium, tin, zinc, manganese and lead, are generally used to accelerate the reaction. It is also well known that the color and thermal stability of the resulting polyester products and the reaction kinetics are notably changed depending on the reaction catalysts used. Typically, the reaction for forming polyesters is conducted over a long period of time and at a high temperature in the presence of metallic catalysts. This is because the reactions used for forming polyesters having a high degree of polymerization in a short period of time are accompanied by several undesirable side reactions that result in the polyester products being yellow in color, having an increased content of DEG, and a concentration of terminal carboxyl groups in excess of optimum levels. Consequently, the physical properties of the polyesters, for example, their melting point, strength, and the like, are deteriorated.

There are several methods for solving the above-mentioned problems, one of which is by using newly developed catalysts. However, there is no known catalyst which can be substituted for the compounds of antimony. These antimony compounds, especially antimony trioxide, are used because they are inexpensive and have good catalytic properties and thermal stability.

The catalysts being used in the above-mentioned conventional methods for forming polyesters, however, have a negative influence on the physical properties of the resulting polyester products. That is, almost of the catalysts used in the conventional methods discolor the resulting polyester products (for example, U.S. Pat. No. 3,927,052, Japanese Laid-open Patent Publication No. 1-245,015) or increase the content of diethylene glycols (Japanese Patent Publication No. 62-265,324) thereby causing a deterioration of the physical properties of the polyesters.

SUMMARY OF THE INVENTION

Accordingly, it is an object of the present invention to provide a new and improved method for forming polyesters which possess improved color and low diethylene glycol content.

The method according to this invention comprises initially forming bis (beta-hydroxyethly) terephthalate oligomers having an average degree of polymerization not exceeding 5 by the direct esterification of terephthalic acid and ethylene glycol and, thereafter, forming bis (beta-hydroxyethyl) terephthalate prepolymers having an average degree of polymerization ranging from 10 to 50 by reacting the oligomers, and then forming polyesters having a high degree of polymerization by mixing the oligomers and the prepolymers in an optimum ratio and polycondensing the mixture.

In the above method according to the present invention, the average degree of polymerization of the oligomers is generally from 2 to 5, and the average degree of polymerization of the prepolymers is from 10 to 50, preferably from 15 to 30. Further, the ratio of the oligomers to prepolymers in the mixture ranges from 0.1 to 9.0 by weight, and preferably from 0.5 to 2.0.

The catalysts used in the present method are compounds of antimony, such as antimony trioxide or antimony triacetate, and compounds of phosphorus, such as trimethyl phosphate or triphenyl phosphate, are used as stabilizers. However, there are several other catalysts that can be used in place of the above-mentioned antimony catalysts which will achieve the objects of the present invention, for example, compounds of titanium, such as titanium isopropoxide or titanium butoxide, compounds of germanium, such as germanium oxide, and compounds of tin, such as dibutyltin oxide or n-butyl hydroxytin oxide. Also, it may be possible to use the antimony catalysts and the other catalysts identified above together.

Although there is no limit on the use or quantity of catalysts used, it is advantageous to use sufficient catalyst to provide the desired reaction velocity based upon the reaction conditions. Accordingly, the proper quantity of the catalysts to the amount of the resulting polyester products may range from 150 ppm to 450 ppm, and the proper quantity of stabilizers may range from 50 ppm to 250 ppm.

The direct esterification step according to the present invention comprises initially forming a slurry of ethylene glycol and terephthalic acid having a molar ratio ranging from 1.05 to 2.0, continuously feeding the slurry to an esterification reactor, and reacting the slurry for 5 hours at a temperature ranging from 230° C. in order to form oligomers having an average degree of polymerization not exceeding 5. Subsequently, a portion of the oligomers are reacted in the presence of catalysts and stabilizers for 20–60 minutes under a pressure of 10 torr at a temperature ranging from 270° C. to 290° C. in order to form prepolymers having an average degree of polymerization ranging from 10 to 50. Then, the prepolymers and oligomers are mixed in an optimum ratio, as mentioned previously, to form a mixture, the mixture then being corrected to provide a mixture in which the quantities of the catalysts and stabilizers are fixed with regard to the amount of resulting polyester products which have a degree of polymerization exceeding 100. Finally, a polyester is formed by polycondensing the corrected mixture for 2 hours under a pressure of 2 torr at a temperature ranging from 285° C. to 295° C.

Accordingly, the method of the present invention provides high quality polyesters having improved coloration and lower DEG content than prior methods in a shorter period of time.

DETAILED DESCRIPTION OF THE INVENTION

The following non-limiting examples will better demonstrate the method for forming polyesters of the present invention.

In the examples, the reaction rate of the esterification reaction is calculated using an acid value (AV) and a saponification number (SN) of the esterification products as follows:

$$\text{esterification rate} = \frac{SN - AV}{SN} \times 100 \, (\%), \text{ wherein}$$

acid value (AV): a value calculated by titration in which alkali titrates the solution of the esterification products in benzyl alcohol, saponification number (SN): a value calculated by back-titration using an acid of the esterification products after hydrolysis by an alkali.

In the examples, the "parts" identified thereon are by weight unless otherwise stated. In addition, the intrinsic viscosity of the polymers is measured at a temperature of 30° C. using a solution of phenol (6 parts) and tetrachloroethane (4 parts). The DEG content is measured from the decomposition products of a polymers in hydrazine by gas chromatography. The color of the polymers is measured by a color diffractometer, the L values and b values describing the lightness and degree of yellow coloration of the polyesters, respectively. A higher L value and a lower b value indicates improved coloration.

EXAMPLE 1

A slurry made of 35 parts of ethylene glycol and 85 parts of terephthalic acid (the molar ratio of ethylene glycol/terephthalic acid=1.1) was continuously fed into an esterification reactor in which esterification products were already present and directly esterified for 4 hours and 30 minutes at 250° C. The esterification reaction rate was 96.5 percent and the average degree of polymerization of the oligomers obtained did not exceed 5.

Subsequently, 50 parts of these oligomers were fed into a prepolymer reactor in addition to 350 ppm antimony trioxide and 100 ppm trimethyl phosphate (TMP) and reacted for 30 minutes with a vacuum at 10 torr and the temperature at 280° C. Prepolymers having an average degree of polymerization of 15 were formed. Thereafter, 30 parts of the resulting prepolymers and 30 parts of the resulting oligomers formed from direct esterification were mixed (weight ratio of oligomers/prepolymers=1.0) and the mixtures corrected to provide mixtures in which the amount of antimony trioxide and TMP with regard to the amount of the resulting polyester product were 350 ppm and 100 ppm, respectively. Thereafter, the corrected mixtures were polycondensed in a polycondensation reactor for 2 hours in a vacuum of 0.2 torr and a temperature of 290° C. The polycondensation products formed thereby were extruded from the lower nozzle of the reactor into the cooling water in order to form chip state polymers. The characteristics of these polymers are described in Table 1.

COMPARATIVE EXAMPLE 1

After forming oligomers using the same process as described in Example 1, the resulting oligomers were polycondensed without mixing with the prepolymers. In this example, the catalyst, the stabilizer and the conditions of polycondensation were the same as those in Example 1.

EXAMPLES 2 to

The oligomers were formed using the same processes as used in Example 1. However, the catalysts, the stabilizers and the ratio of prepolymers to oligomers were changed in each example. The time of polymerization in all examples was 2 hours. The characteristics of the products are provided in Table 1.

TABLE 1

| Examples | Catalyst | Stabilizer | Polymerization of polymer | Weight ratio of prepolymer 1 oligomer | Intrinsic viscosity (η) | Content of DEG (weight %) | L value | b value |
|---|---|---|---|---|---|---|---|---|
| Example 1 | antimony trioxide | TMP | 15 | 1.0 | 0.70 | 0.63 | 65 | 2.1 |
| Comp. Example 1 | antimony trioxide | TMP | — | — | 0.63 | 0.69 | 62 | 2.5 |
| Example 2 | antimony trioxide | TMP | 20 | 2.0 | 0.73 | 0.62 | 64 | 2.0 |
| Example 3 | antimony trioxide | TMP | 30 | 2.0 | 0.71 | 0.65 | 67 | 2.3 |
| Example 4 | antimony acetate | TMP | 20 | 0.5 | 0.66 | 0.67 | 69 | 2.3 |
| Example 5 | antimony acetate | TPP* | 30 | 1.0 | 0.67 | 0.63 | 70 | 2.1 |
| Example 6 | antimony anhydride | TPP | 20 | 4.0 | 0.64 | 0.69 | 63 | 2.4 |
| Example 7 | Titanium outoxide | TPP | 20 | 1.0 | 0.79 | 0.71 | 68 | 3.2 |

*Triphenylphosphate coloration.

What is claimed is:

1. A method for forming polyester from terephthalic acid and ethylene glycol comprising
   (a) reacting terephthalic acid and ethylene glycol to yield bis (β-hydroxyethyl) terephthalate oligomers;

(b) separating the oligomer into first and second portions;

(c) polycondensing said first portion of oligomers to form bis (β-hydroxyethyl) terephthalate prepolymers; and (d) polycondensing a mixture of said second portion of oligomers and prepolymers to form polyester, wherein the degree of polymerization of the prepolymers is from 10 to 50.

2. The method as claimed in claim 1, wherein the molar ratio of terephthalic acid and ethylene glycol in step (a) is 1:1.05-2.0.

3. The method as claimed in claim 1, wherein the weight ratio of the mixture of oligomers and prepolymers of step (d) is 1:0.1-9.0.

4. The method as claimed in claim 1, further comprising adding a catalyst during steps (c) and (d) such that the amount of the catalyst as compared to the amount of the resulting polyester product is from 150 ppm to 450 ppm.

5. The method as claimed in claim 1, further comprising adding a stabilizer during steps (c) and (d) such that the amount of the stabilizer added in said steps as compared to the amount of the resulting polyester product is from 50 ppm to 250 ppm.

* * * * *

UNITED STATES PATENT AND TRADEMARK OFFICE
CERTIFICATE OF CORRECTION

PATENT NO. : 5,243,022
DATED : SEPTEMBER 7, 1993
INVENTOR(S) : CHUNG Y. KIM AND HYUN N. CHO

It is certified that error appears in the above-identified patent and that said Letters Patent is hereby corrected as shown below:

ON THE TITLE PAGE:

[57] ABSTRACT, line 12, delete "1:90" and substitute therefor -- 1:9.0 --.

IN THE SPECIFICATION:

Column 4, line 37, after "EXAMPLES 2 to" insert "7"; and

In Table 1, "Example 7" under the heading of "Catalyst", last line, delete "outoxide" and substitute therefor -- butoxide --.

IN THE CLAIMS:

Column 5, line 1, add "s" to "oligomer".

Signed and Sealed this

Fourteenth Day of February, 1995

*Attest:*

BRUCE LEHMAN

*Attesting Officer*     *Commissioner of Patents and Trademarks*